Aug. 7, 1973 N. M. BORTNICK 3,751,527
PROCESS FOR DELIQUEFYING, PURIFYING AND BLENDING POLYMERS
Filed Nov. 18, 1971 4 Sheets-Sheet 4

United States Patent Office 3,751,527
Patented Aug. 7, 1973

3,751,527
PROCESS FOR DELIQUEFYING, PURIFYING
AND BLENDING POLYMERS
Newman M. Bortnick, Oreland, Pa., assignor to Rohm
and Haas Company, Philadelphia, Pa.
Filed Nov. 18, 1971, Ser. No. 199,912
Int. Cl. C08f 29/24
U.S. Cl. 260—899                                                16 Claims

ABSTRACT OF THE DISCLOSURE

The present invention is concerned with separation of the liquid from the solids of an emulsion polymer latex in such a manner as to achieve removal as well of water-soluble components, such as emulsifiers, catalysts, and other materials which, though needed to produce the latex, are undesirable contaminants when the latex is used for some purposes. It is also concerned with an efficient process for the blending of the polymer solids of a latex with another polymer. These objectives are accomplished by special adaptation and modification of a screw- or worm-type of press or extrusion equipment.

---

During the polymerization of various types of polymers by various methods, such as bulk polymerization, solution polymerization, and emulsion polymerization, considerable amounts of starting materials may remain in the polymer products. These include, among others, unreacted monomer, solvent, dispersing agents, other surfactants of various types, products of undesirable side reactions, catalyst residues, various salts and some decomposition products. As is well known in the art, this contamination of the final polymer product is sometimes undesirable due to the adverse effects it has on polymer properties when the polymer is to be used for certain purposes. A portion of these contaminating products are volatile and can be removed from the polymer compositions by a process of evaporation as by distillation. Generally, this involves introducing the polymer into a heated low pressure chamber to flash evaporate residual monomers, solvents, and other volatiles contained in the polymer. A major drawback of this method is that considerable vapor is entrained in the formed polymer and remains in the final product. Furthermore, the natural cooling which accompanies the vaporization has a marked effect on the viscosity, increasing it to a point where it becomes extremely difficult to work with the polymer. Additionally, since only volatile impurities are removed in vapor form, all of the non-volatile impurities, even though dissolved in the volatile impurities before evaporation of the latter, remain in the polymer and may be responsible for many problems arising during the use of articles made from the polymer.

An object of the invention is to provide a method for removing volatiles, such as residual monomer(s) remaining in the product of bulk polymerization, solvent(s) and/or residual monomer(s) remaining in the product of solution polymerization, the liquid disperse phase and/or residual monomer(s) present in the product of emulsion polymerization or of the types of polymerization that produce non-aqueous dispersions, in which these liquid components are for the most part removed in the liquid state from the polymer components of the products obtained by these various types of polymerization procedures. By maintaining the various liquid components mentioned in the liquid state as they are removed, such removal serves as well to remove residual solid contaminants, which are dissolved or dispersed in such liquid components.

One particularly important object of the invention is to provide a novel process for removing a large part of the water of a latex and also water-soluble contaminants therein by expressing the liquid phase of the latex as a liquid and subsequently volatilizing the minor residual portion of volatile matter, such as water and monomers, from the solid polymer after expressing the liquid therefrom, such as by means of a screw press. This process is aided by maintaining conditions in the screw channel that break the dispersion and thereby coagulate the polymer therein. Such conditions may include temperature, shear, or introduction into the screw channel of a material having coagulant properties, such as another polymer, a non-solvent for the polymer, or a salt solution.

Another object of the present invention is to provide a process for blending and devolatilizing polymers, which process substantially prevents or alleviates one or more disadvantages of the prior art. By the term "devolatilizing" is meant removing volatile matter.

Another object is to provide a process for blending and devolatilizing polymers wherein at least one of said polymers has been emulsion polymerized.

A further object is to provide a process for blending polymers wherein at least one polymer contains water and at least another does not contain water.

A further object is to provide a process for dispersing the polymer of a latex in a polymer melt and devolatilizing the resulting composition.

Still another object is to provide a process for adding a latex to a polymer melt, including a melt obtained by devolatilizing a solution of the latter polymer in an organic solvent, wherein the major volatile component or components is or are first removed in the liquid state so as to carry with it or them various water-soluble contaminants, such as salts, soaps, catalyst residues, decomposition products of unfavorable side reactions, soluble monomer, etc.

Figure 1:
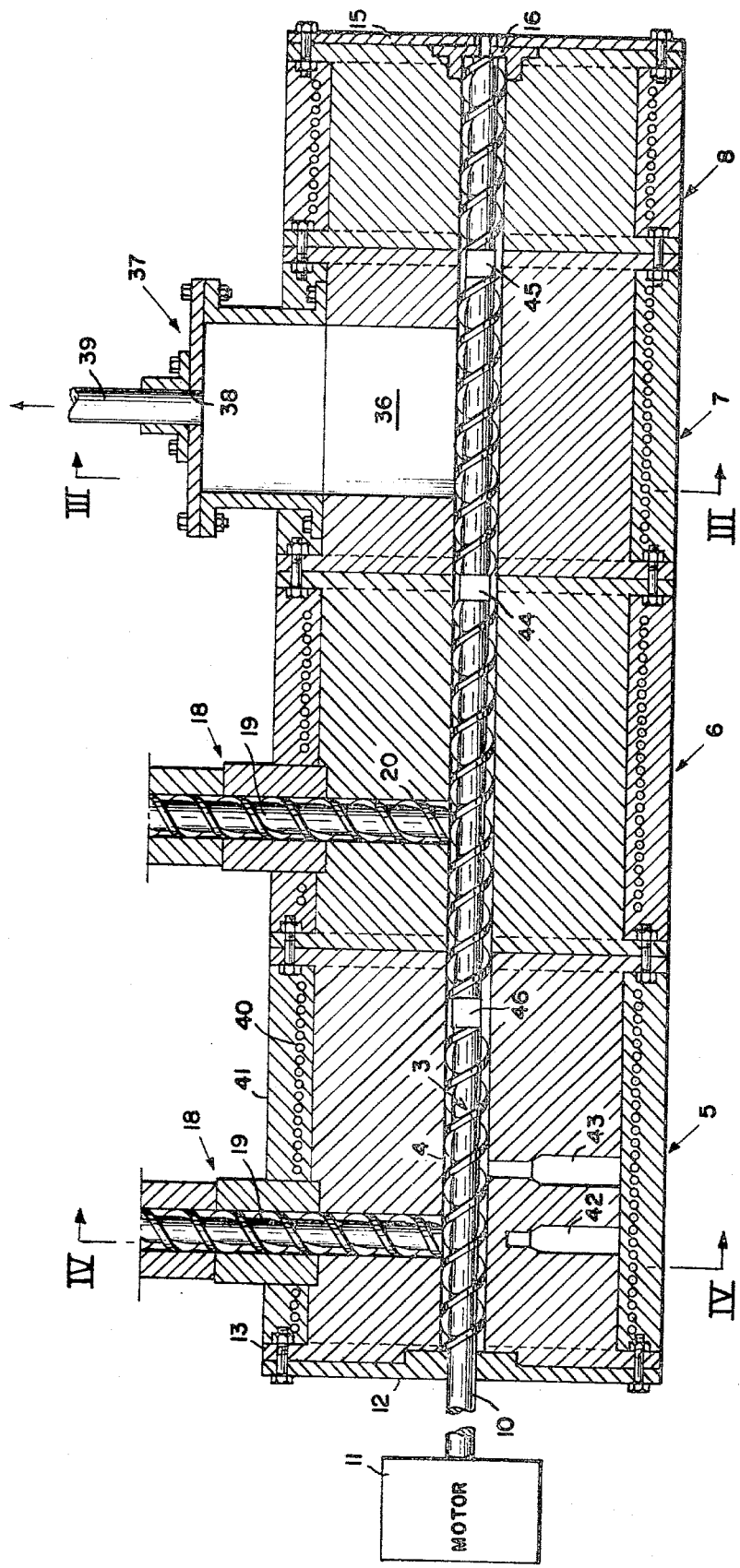
FIG. 1 is a longitudinal cross-sectional view of one embodiment of screw press or extruder adapted to be used in accordance with the invention.

While the specific apparatus that is used to carry out the invention may be varied considerably, an illustrative embodiment is shown in FIG. 1 which can be used for separation of liquids from a polymer solution or dispersion undergoing coagulation.

In this embodiment, means is provided for advancing a liquid-bearing or a liquid-containing polymerized material along a channel, means is provided for feeding the liquid-containing material into the channel, means is provided to heat the channel and its content, optionally especially when such material is not readily coagulated by heat and/or shear, means is provided for introducing a coagulant into such a material as it is fed into the channel or in the vicinity of its entry into the channel, liquid-discharge means is provided along the channel, and means is provided to control the pressure exerted upon the coagulated polymer system as it proceeds through a zone of the channel embracing the entry and discharge means.

Figure 2:
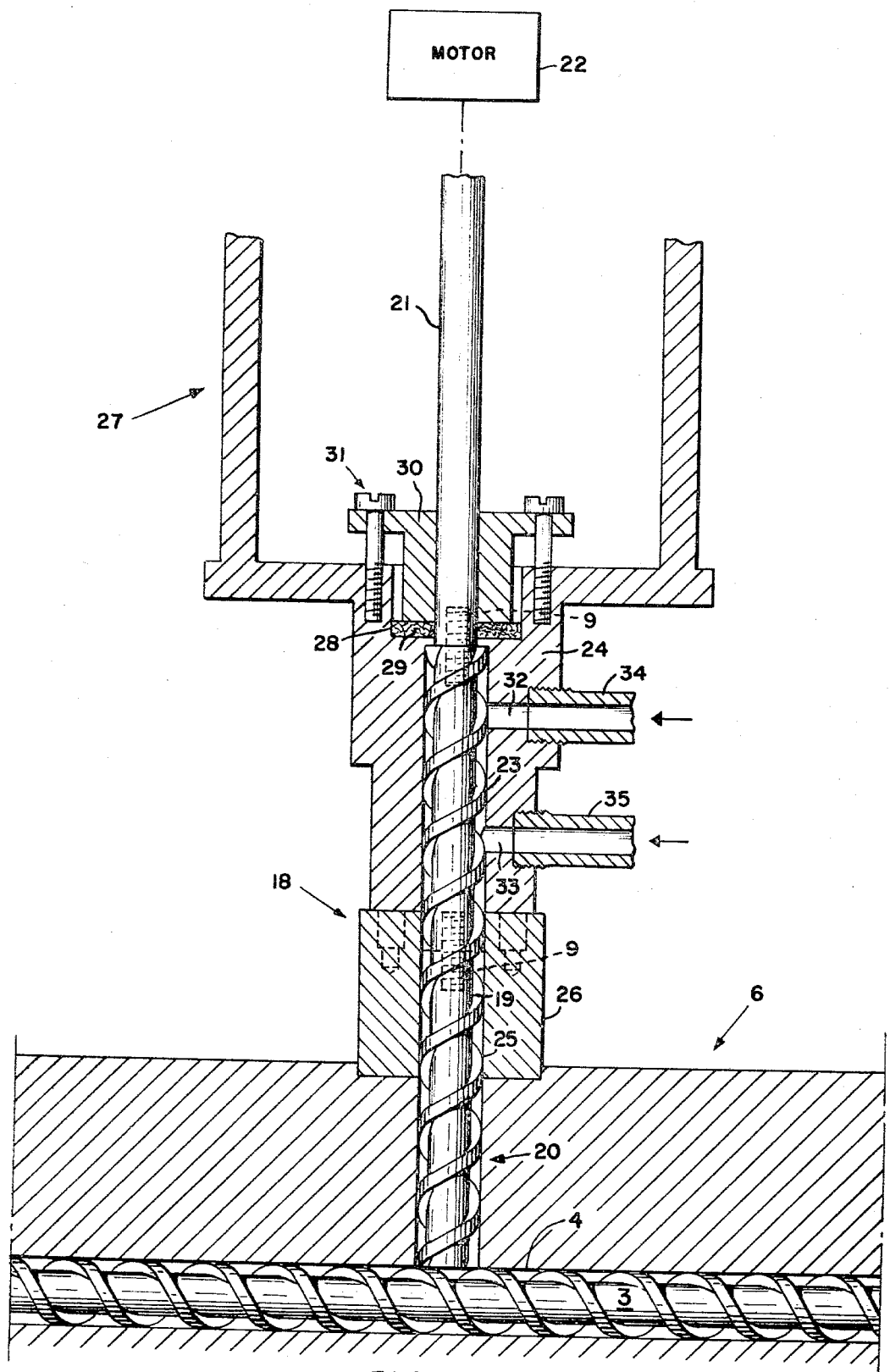
FIG. 2 is a cross-sectional view of a vent cleaner.

As shown in FIG. 1, screw means 3 extends longitudinally through a channel 4. The screw means may comprise a number of sections corresponding to the sections 5, 6, 7 and 8 of the generally cylindrical housing through which the channel extends. Each section of the screw is coupled with each adjacent section as illustrated in FIG. 2 by a coupling which is threaded in the opposite direction of the screw rotation, the ends of which fit in mating sockets or recesses in the adjacent ends of the sections joined thereby. The screw is similarly coupled to the drive shaft 10 driven by an electric motor 11 shown at the left of FIG. 1.

Figure 3:
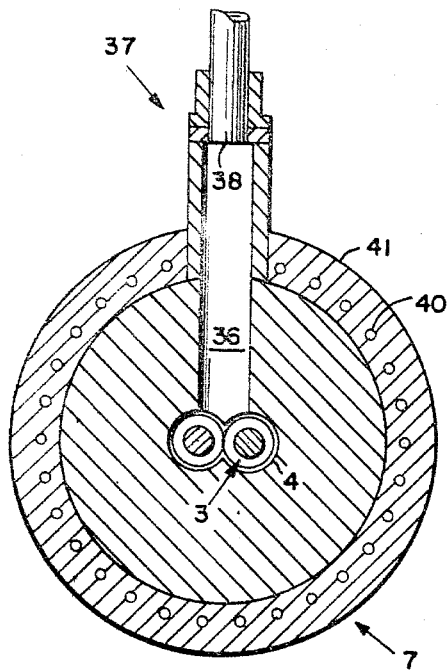
FIG. 3 is a cross-sectional view taken on line III—III of FIG. 1.
Figure 4:
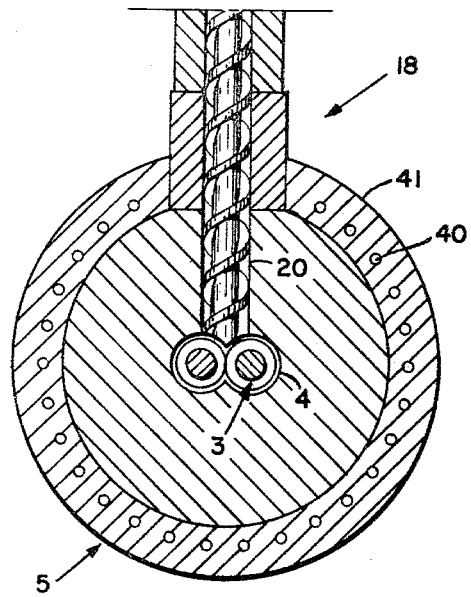
FIG. 4 is a cross-sectional view taken on line IV—IV of FIG. 1.

The cross-section of channel 4, as shown in FIGS. 3 and 4, comprises two side-by-side essentially cylindrical passages which are open to each other along their entire length with close clearance of the twin screws within their enclosing surface. When a single screw is employed, the channel 4 is, of course, of cylindrical cross-section and its inside surface has close clearance with the screw operating within.

In the specific embodiment shown in FIG. 1, the left end of section 5 is closed by a plate 12 bolted to the flange 13 of section 5 and provided with a suitably sealed and packed bearing within which shaft 10 is supported for rotation in such a manner that liquid in the channel 4 cannot escape even under the super-atmospheric pressure to which this section of the channel is subjected during operation.

Figure 5:
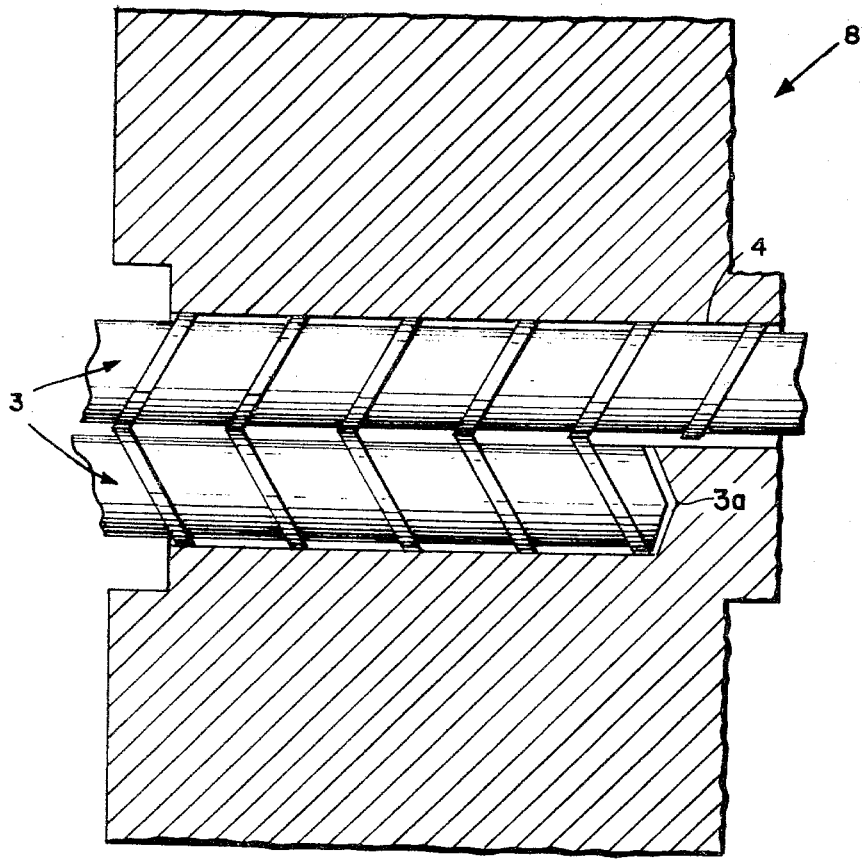
FIG. 5 is an axial section of the terminal part of the extruder component of an embodiment of FIG. 1 using a twin-screw type of press.

A similar plate 15 modified to support an extrusion die plate 16 is similarly bolted to the right end of the extrusion section 8 so that the die plate is aligned with this end of the channel 4. The die plate may simply have one or more openings (circular, elliptical, rectangular or of any other shape) in alignment with the axis of the channel 4. When twin screws are used as shown in FIGS. 3 and 4, one of them terminates, as at 3a in FIG. 5, and the die openings are aligned with the remaining cylindrical channel.

There is also shown in FIG. 1 sections 6 and 7. Section 6, like section 5, is provided with a generally radially extending vent passage for entry or exit of liquid, which passage may contain what is generally referred to in the art as a vent cleaner 18 while section 7 is a vacuum section which serves to remove residual liquid, as a vapor, from the polymer mass before it reaches the extrusion zone 8.

One of the vent passages which may be equipped with a vent cleaner serves as an inlet for the liquid-containing polymer material and the other as an outlet for the liquid forced out of it by the action of the screw press. In the embodiment of FIG. 1, the vent passage in section 6 serves as an inlet and the "cleaner" therein comprises a screw 19 which extends into a radially extending bore 20 in the housing or barrel of section 6. As shown more particularly in FIG. 2 bore 20 communicates with channel 4 and is coupled with a shaft 21 which is driven by an electric motor 22 in a clockwise direction as viewed from the bottom end of screw 19 so the screw flights feed any contents in the bore 20 into the channel 4. The screw 19 extends through a bore 23 in the cylindrical member or barrel 24 and through a bore 25 of the fitting 26 fixedly mounted on the housing of section 6 and secured to the member 24 so that bores 20, 23, and 25 which have the same diameter are in alignment. A yoke 27 is integrally formed with the member 24 and extends upwardly from it to provide a support for the motor 22.

An enlarged bore 28 receives an annular packing 29 and a packing gland 30 having a central bore adapted to receive the shaft 21 for free rotation therein. Cap screws 31 are provided to compress the packing and thereby seal the shaft and prevent escape of the contents of bore 23 so that suitable superatmospheric pressure may be maintained in the bores 23, 25, 20, and the channel 4.

Ports 32 and 33 communicate with bore 23 of member 24 and are provided with threaded bores which receive the pipes or conduits 34 and 35 respectively. Suitable pumps (not shown) have their discharge ports connected to these respective conduits 34 and 35 which may also be provided with valves which may be closed, if desired, but are normally open when this vent cleaner is used to supply the liquid-containing polymer material or mass to the system. The pump connected to conduit 34 may be connected with a supply tank or other container for the liquid-containing polymeric material to be fed into the system. The pump connected to the conduit 35 on the other hand may be connected to a supply tank containing a coagulating agent which when mixed with the liquid-containing polymer material whether the latter is a solution or dispersion throws the polymer out of solution or dispersion at the temperature prevailing where these two materials make contact or that prevailing in section 6 wherein they are introduced together. If the liquid-containing polymeric material is coagulated sufficiently rapidly by the heat or shear existent in the press or by another heated polymer material when such is to be blended with the first, conduit 35 may be omitted, plugged or shut off by a suitable valve.

The other passage namely that provided in section 5 which, as stated may also be provided with a vent cleaner 18 which serves as a discharge for the liquid phase, and which may have the same construction as that of the vent cleaner which serves as an inlet. However, one or both of the conduit 34 and 35 are in this instance provided with pressure relief valves so that one or both open to discharge liquid when a certain pressure is attained. If desired only one of these conduits may be provided with such a pressure relief valve, the other being closed by a valve that is not responsive to pressure.

While the description so far has indicated that the vent passage in section 6 is the inlet and that in section 5 is the outlet for liquid that is separated, the system may be connected to reverse this situation so that the inlet is in section 5 and the outlet is in section 6.

The housing or barrel of the vacuum section 7 has an extended slot or groove 36 in its upper portion so that the slot communicates with the channel 4 along its upper extent in this section. A cover or box 37 is fastened above the housing of this section so as to enclose the slot except for the port 38 in the box which is connected by a conduit 39 to means, such as a vacuum pump, for reducing the pressure in the box 37, slot 36, and channel 4 in section 7.

If desired, a section may be inserted between section 6 and vacuum section 7 which exposes the polymer in the channel 4 to atmospheric pressure. Such a section has a slot or groove 36 as in section 7 but such slot is exposed to the ambient atmosphere and is not enclosed by the vacuum box 37. When such an additional atmospheric pressure section is used, a considerable amount of the liquid is removed therein by simple evaporation to the surrounding atmosphere. If an atmospheric section is provided, the screw or screws therein should have a "compounder" section at the end adjacent the vacuum section 7.

Heating means 40 may be, and generally is, provided for each section. It is shown as an electrical resistance coil around section 5 and it is surrounded by a heat-insulating jacket 41. Thermocouples may be provided at numerous points along the screw press to ascertain the temperatures existing at various selected points along the channel 4. Thus in the housing of section 5, thermocouple wells 42 and 43 are shown, the former of which does not reach into the channel 4 itself so that the temperature of the housing body just around the channel 4 can be measured, and the latter of which communicates with channel 4 to permit a thermocouple therein to measure the temperature in the channel 4.

To provide different pressures in different zones or sections of the screw press, the screw is provided with one or more so-called compounders. These may take various forms. In FIG. 1, three compounders of simple cylindrical structure are shown at 44, 45, and 46. Thus, 44 constitutes a strictly cylindrical section at the end of the screw in section 6 having a diameter between that of the root diameter and flight diameter of the immediately preceding screw in section 6. This maintains a high pressure in sections 5 and 6. Furthermore, the presence of compounders 44 and 45 at each end of the vacuum section 7 practically isolates the reduced pressure to that section and thereby prevents the vacuum interfering with the pressing out of liquid in zones 5 and 6 and with the extrusion in zone 8. Compounder 46 between the inlet and exit vent cleaners serves to minimize solids in the aqueous effluent through the exit.

The zones between successive compounders define separate sections of the worm. However, the locations of the compounders is not necessarily coincident with the flanges of the barrel or housing.

Instead of simple cylindrical compounders that are shown, a compounder may be used in the form of a screw but with its flights the reverse of those on the adjacent screw sections so that the flights of the compounder opposes the forwarding action of those on the adjacent screws, and especially on the immediately preceding section of the screw(s).

It is also within the scope of the present invention to accomplish the objects of the present invention by providing various root diameters of the screw in various sections along the channel, thereby aiding in the attainment of various pressures in various sections along the screw.

The embodiment of FIG. 1, as stated before, is useful to separate a liquid as a liquid from a polymer solution or latex. For example, in the example of a latex, it may be pumped into port 32 of the inlet vent (provided with cleaner 18) in section 6 and at the same time a coagulating liquid, e.g. a 2% $CaCl_2$ solution is forced into port 33 of the same vent cleaner. The temperature maintained in the channel 4 along sections 5 and 6 depends on the polymer being handled. The temperature should be high enough to render the polymer a viscous plastic material but it should not be so high that the polymer becomes a liquid. Another way of putting the temperature requirement is that it should be high enough to cause the coagulated polymer to become sufficiently tacky that it tends to adhere to the screw and the coagula adhere together so that they can be forwarded by the screw, while allowing the liquid to slip back as it is pressed out during the forwarding of the polymer by the screw flights toward the high pressure end of zone 6 created by compounder 44.

The liquid is forced back to the outlet vent passage (containing a cleaner 18) in section 5 where it is discharged through one or both conduits 34 and 35 under the control of the pressure relief valve or valves therein.

The pressure maintained by setting of one or both of the relief valves is selected to prevent volatilization of the liquid (water in the case of the latex) in sections 5 and 6 under the temperature conditions prevailing. The screw in the vent cleaners 18 of sections 5 and 6 are driven in such a manner as to force any polymer tending to rise into the vent passages, such as bore 20, back into the channel 4.

A typical latex that can be advantageously handled by the present invention is that of Example 1 of U.S. Pat. 3,562,235 having a 55% solids content of which about 0.8% is emulsifier. For this latex, the temperature of channel 4 in zones 5 and 6 may be 75 to 300° C. and the pressure may be 20 to 2000 p.s.i.

The coagulating agent may be an aqueous 5% sodium chloride solution or an aqueous 2% calcium chloride solution.

The water contains dissolved in it, as it is discharged from the outlet vent passage containing the vent cleaner 18 of section 5, most of the emulsifier and residual contaminants, such as acetic and catalyst residues that were present in the latex as well as the salt used for coagulation.

As the polymer coagulum enters zone 7, it may contain 5 to 15% volatile liquid matter and this is reduced by evaporation to about 0.3 to 2.0% respectively in this vacuum section. The pressure in this section may be from 0.1 to 29 inches of mercury and the dwell time of the polymer herein may be 1 to 50 seconds.

The polymer that is extruded in section 8 is practically free of contaminants that would otherwise have been present if the water of the latex were to be removed by evaporation as has generally been customary.

If desired, further purification can be provided by adding another port downstream of the pair (5 and 6 of FIG. 1) into which water may be pumped to flow countercurrent to the polymer stream.

It is to be understood that the invention is not to be limited to the specific screw press illustrated in FIG. 1. While the screw press shown therein uses a twin screw, a single screw operating in a cylindrical channel may also be used. Similarly, a twin screw may be used in the vent cleaners instead of the single screw shown. Again, two sections 5 and 6 are shown wherein the liquid is expressed as a liquid. Instead, a single section provided with both an inlet vent passage and an outlet vent passage may be used.

The equipment of FIG. 1 is quite suitable for removing liquid from a solution or dispersion of a polymer which, when coagulated in the presence of the solvent or disperse phase liquid, is not tacky at room temperature. It is only necessary to raise the temperature of the coagulated system high enough to render the polymer tacky which may occur at a temperature in the range of 40° C. to 250° C. depending upon the particular polymer and somewhat on the swelling characteristics of the solvent or disperse phase liquid.

The apparatus shown in FIG. 1 may be modified to serve not merely the removal of liquid from a polymer solution or latex but also to concurrently and/or simultaneously serve other purposes, such as blending two or more polymers with each other while removing liquid from one or more of such polymers which may be supplied to the equipment as polymer solutions or dispersions. In such an embodiment, one of the polymer solutions or dispersions may serve to coagulate the other. For instance, an anionic polymer latex may be introduced along with a cationic polymer latex into the liquid-expressing section or sections of the screw press. The relative amounts of the two or more polymer solutions or dispersions that may be so mixed may fall in a wide range, such as from about 1% by weight of one of the polymers to 99% by weight the total of the other polymer(s).

One particularly important embodiment of this modification involves the blending of a molding polymer, such as a homopolymer of methyl methacrylate or vinyl chloride or a copolymer thereof, such as a copolymer of methyl methacrylate with a relatively small amount of a $(C_1–C_8)$ alkyl acrylate, such as ethyl acrylate, or a copolymer of vinyl chloride with a relatively small proportion of vinyl actate, with another polymer, which may serve to modify the vinyl chloride or methyl methacrylate polymer, such as to improve its impact resistance. Such a modifying polymer is often made commercially by an emulsion polymerization process and, before blending with the vinyl chloride polymer, the usual practice has been to coagulate the latex, dry the precipitated polymer, and then to blend the two dry polymers on heated two-roll or three-roll rubber mills. In accordance with the present invention, the dewatering of such a latex and blending with the main polymer, such as of methyl methacrylate or vinyl chloride, are simultaneously accomplished in a single piece of equipment.

Figure 6:
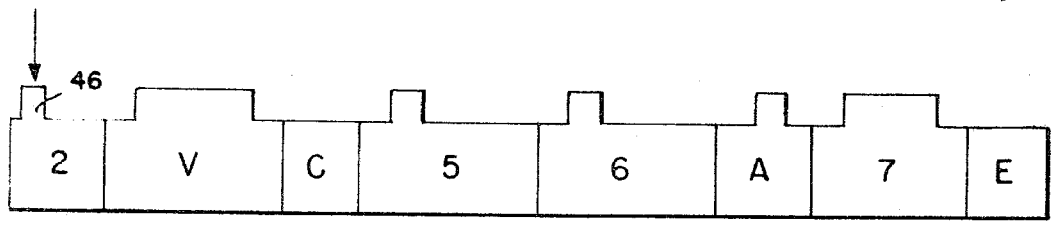
FIG. 6 is a diagrammatic view of a modification of the screw-press equipment of FIG. 1.

FIG. 6 is a schematic view illustrative of a modification of the screw-press equipment of FIG. 1 that is adapted to dewater a latex and blend the polymer thereof with another polymer to modify the latter. In this embodiment, the main polymer is in a polymer sirup containing residual monomer and solvent and an insignificant amount of solid contaminant soluble in the liquid solvent and monomer. In this schematic view, sections 5 and 6 are the same as in the embodiment of FIG. 1. Section V of FIG. 6 is a vacuum section like the vacuum section 7 of FIG. 1. Section A is the atmospheric section mentioned as optional but not shown in FIG. 1. Section E is the extruding section 8 of FIG. 1. Plate 12 of FIG. 1 is removed and sections designated 2, V, and C are secured between plate 12 and the left end of section 5 as shown in FIG. 1. Each of sections 2, V, and C is provided with a channel 4 in alignment with such channel in sections 5, etc. Extensions of the screw or scraws are coupled to the motor shaft 10 and to the screws in sections 5 etc. and, of course, suitable means, such as plate 12 with its sealed bearing for receiving the shaft, closes the left end of section 2 as seen in FIG. 6 wherein the end plate 12 and die plate are not shown.

Section 2 is provided with a port 46, communicating with channel 4 therein, for admitting a molten or granular polymer or a polymer sirup under pressure and this port may be fitted with an inlet vent cleaner of essentially the same construction as shown in FIG. 1 except that only one of the ports 32 and 33 is provided for receiving molten polymer or a polymer sirup from a supply thereof through a positive displacement pump and a conduit communicating with the inlet port of section 2 directly or through the inlet vent cleaner if such is provided in the port of section 2. The screw has a compounder at the exit of 2 to isolate 2 from the vacuum in section V. Section C is a compounder section to isolate the reduced pressure zone in 5. The temperature of the channel 4 in sections V and C is maintained high enough to assure that the polymer therein after evaporation of solvent and/or monomer is in molten condition or at least in a fluid plastic condition even though still quite viscous.

The latex may be introduced into either section 5 or 6 and the water expressed from it may be discharged from the other of these sections thereby supplying the latex to the other polymer in channel 4 either in concurrent or countercurrent flow relationship.

The remaining sections A, 7, E operate as described in respect to FIG. 1, A being the atmospheric pressure section referred to therein, and E being the extrusion section.

The monomer and/or solvent removed in the vacuum section V may be recovered, e.g. it may be recycled to the polymerization reactor if that is the source of supply for the polymer sirup fed to section 2.

Figure 7:
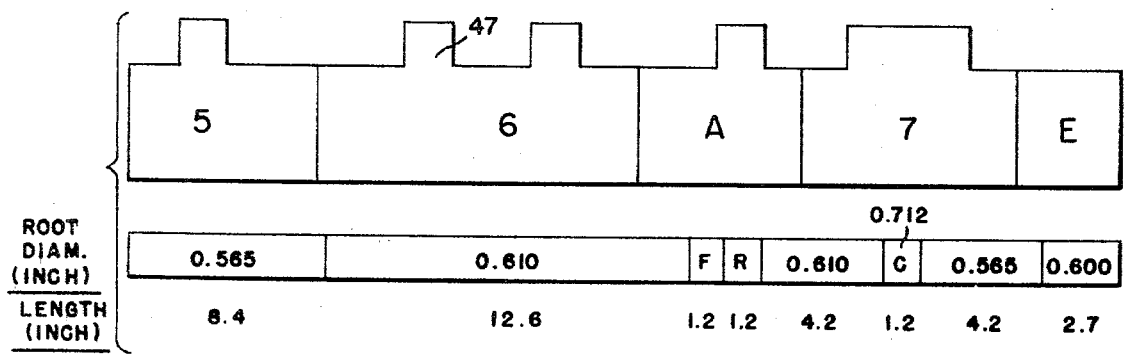
FIG. 7 is a schematic diagram of a variation of the embodiment of FIG. 1.

FIG. 7 shows a schematic diagram of a variation of the embodiment of FIG. 1 which serves to remove water and contaminants dissolved therein from a latex, such as that of Example 1 of U.S. Pat. 3,562,235 before it is coagulated. The upper portion of the figure shows the sections 5, 6, A, 7, and E corresponding in function to the so-designated sections of FIG. 6. The only difference is the provision of a port 47 communicating with channel 4 through which a coagulating medium may be introduced under pressure by a positive displacement pump connected by suitable conduits to the port 47 and a supply tank containing the coagulating agent. This port may be equipped with a vent cleaner having a downwardly feeding screw, if desired. The provision of this port 47 allows one of the ports 32 and 33 of the inlet vent passage or cleaner to be shut off by the valve in the conduits 34 and 35, using the other solely to supply latex to the inlet vent passage or cleaner which may be in either of sections 5 or 6, the outlet vent passage or cleaner being in the other of these two sections. The screw or screws used had a flight diameter of 0.802 inch, the inside diameter of channel 4 was 0.806 inch, the flight width was 3/32 in. and the flight pitch was 0.8 inch. In FIG. 7 along the bottom thereof is a chart indicating the root diameters of the screw in inch at various portions of the channel 4. A simple cylindrical compounder is indicated by the letter C and its diameter is placed above it.

A reverse flight compounder generally consists of a short forward flight section F immediately followed by a reverse flight section R. The flight compounder generally consists of a short forward flight section F immediately followed by a reverse flight section R. The flight diameter, root diameter, flight width and flight pitch in F are 0.804 in., 0.679 in. 3/32 in. and a short pitch of 6½ turns per diameter. These dimensions in R are the same but the flights are reversed.

In operation, the latex is forced into the system through the inlet vent passage or cleaner in section 5 or 6, the coagulant, e.g. 2% aluminum sulfate or methanol, is forced into the system through port 47, and the water is discharged from the system through the outlet vent passage or cleaner in section 5 or 6. In the following description specific dimensions, temperatures, and pressures are given followed, in brackets, by a range of dimensions of temperatures, or of pressures respectively that can be used satisfactorily.

The latex, heated to 80° C. [30°–>100° C.] was pumped at a rate of 200 cc./min. [40–400] under 60 p.s.i. [25–1000] pressure into the "vent cleaner" inlet composed of a down-driving worm within a barrel mounted on a vent section of the 0.8 inch twin screw extruder. This worm had a crest diameter of 0.804 inch, a root diameter of 0.565 inch [0.460–0.710] a thread thickness of 3/32 inch [0.100–0.200] and a pitch 0.8 inch. The bore of the barrel was 0.806 inch in diameter. The vent cleaner had two ports of entry 32 and 33, into the one (32) farthest from the extruder 5 cc./min. [0–10] of methanol were introduced and into the second the latex was introduced. The vent cleaner screw was driven at 150 r.p.m. [100–350].

Into the port 47, a solution of 2% calcium chloride [or 2% aluminum sulfate or 100% methanol] heated to 100° C. [30–300] was introduced at 60 p.s.i. [20–1000] pressure at 200 cc./min. [40–400]. The coagulum resulting from the mixing of the two feed streams in the extruder was picked up by the screws (the twin screws in channel 4 are counter-rotating mirrored pairs) and carried forward out of the coagulation zone. This coagulation zone was sealed from the rest of the extruder by a short cylindrical section 0.8 inch in diameter and 1.2 inches long or by a forward flight and super-reverse compounder indicated at F and R. Such a seal permits polymer to go forward but prevents the aqueous solution from doing so, at coagulation zone pressures up to 1000 p.s.i. The aqueous solution was removed through a liquid removal system comprising an outlet vent passage preferably equipped with a cleaner, a heat exchanger, and a pressure relief valve. The vent cleaner had one exit port from which the liquid effluent was discharged and then cooled to 50° C. [100–30° C.] by passage through the exchanger rated at 1000 p.s.i. working pressure. The cooled solution then passed through the pressure relief valve set such that a pressure of 35 p.s.i. [25–1000] was needed in the system to expel the effluent. The pressure setting of this valve determined the pressure in the coagulation zone of the screw press; the pressure in the system was developed by the latex pump which was of positive displacement type, such as a gear pump or a piston diaphragm pump. The extruder barrel sections in the cogulation zone (sections 5 and 6) were maintained at 180° C. [100–300° C.]. This temperature is that of the exterior of the barrel and not the contents. The waterstream, just as it left the extruder, was at 140° C. [100–300°] and was in liquid state throughout.

The coagulated polymer which was carried from the coagulation zone passed through the two vent sections A and 7 and then left the extruder through a die section 8. The first of these vent sections was operated at atmospheric pressure and kept at 240° C. [100–380°], the second at 28 in. Hg vacuum [15 to 30] and kept at 260° C. [100–400° C.]. The polymer left the extruder through a die at 250° C. [100–400° C.] and 800 p.s.i. [300–5000].

The isolated polymer contained 0.07% [0.20–<0.05] water and 0.035% [0.025–0.040] calcium chloride when a 2% $CaCl_2$ solution was used as the coagulating agent.

The system just described may be modified by providing a feed section 2 in advance of section 5. Section 2 may conform with section 2 as described in FIG. 6. Such a modified system could be run with no polymer feed in section 2 or with a polymer feed of 5–20 g./min. therein. This polymer could be the same as obtained by the continuous coagulation of the latex, that is recycled polymer, or a different polymer, or a blend or granular or molten polymer and pigment and may be forced into the channel 4 of section 2. The root diameter in section 2 is 0.660 in. for about 4.2 inches, then 0.710 for 3 inches; then there is a cylindrical compounder having a length of 1.2 inches and a diameter of 0.801 in. The use of a slow feed of polymer into the section 2 improves the seal between the section 2 and section 5, improving the color of the product. When a polymer different than the latex polymer, such as a polymer and pigment blend, is added, the second polymer and the pigment are very uniformly mixed into the latex polymer.

The latex stream treated in this embodiment may comprise several different latices fed through ports 32 and 33 of the inlet vent passage or cleaner therein, or it may comprise a latex and an aqueous dispersion of a pigment or other insoluble material fed into the two ports just mentioned. In all of these cases all components are very uniformly mixed in the final product.

The coagulation solution may be composed of a water or alcohol solution of any of a number of salts, such as sodium chloride, sodium sulfate and especially polyvalent metal salts, such as calcium chloride, aluminum chloride or sulfate, etc.

The continuous coagulation and liquid-expressing procedure removes a major fraction of the soap (or dispersant(s)) originally present in the latex as well as the other water-soluble components of the latex. When calcium chloride is used in the coagulation solution only a small amount of calcium is found in the final polymer. The calcium chloride content of the final polymer is not over 0.035, and is generally less than, 0.03 weight percent. The residual monomer level is below 0.2% and when isopropanol or other organics are added to the coagulation zone only traces of them are noted in the final polymer.

Figure 8:
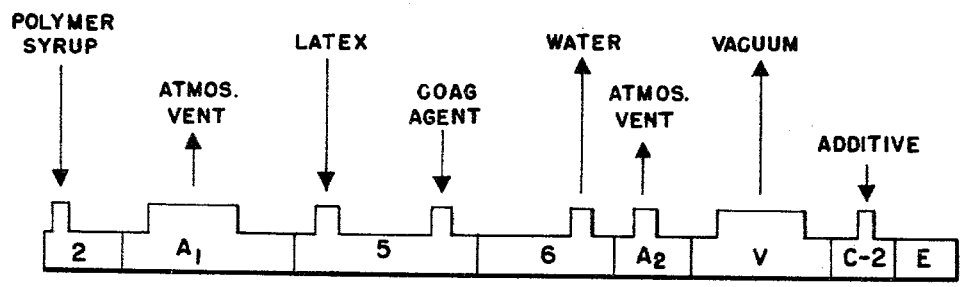
FIG. 8 is a diagrammatic view of a specific embodiment.

A particular example of the embodiment wherein a molding polymer is blended with a modifying polymer in laboratory-scale equipment of the type illustrated in FIG. 6 is shown in FIG. 8. The various sections are labeled in the upper portion of this figure.

In this embodiment the polymer sirup is composed of a 97/3 weight ratio methyl methacrylate (MMA)/ethyl acrylate (EA) copolymer of weight average molecular weight=165,000 and a $\bar{M}w/\bar{M}_n$=2.0 dissolved at 50% concentration in a 97/3 weight ratio mixture of MMA/EA and the latex is a 50% solids dispersion by emulsion copolymerizing 31% MMA in the dispersion obtained by emulsion copolymerization of 56% butyl acrylate and 13% styrene containing about 2 weight percent emulsifier based on polymer weight. The coagulant is 2% aqueous $CaCl_2$.

Description of extruder sections in FIG. 8:

| Type | Length of section, inches | Port(s) diameter, inch | Distance of port center from upstream end, inch |
|---|---|---|---|
| 2 | 5.5 | 0.6 | About 0.3. |
| $A_1$ | 9.6 | 4.8 (slot width) | Extending from 3.6 to 8.4. |
| 5 | 9.6 | {0.8 <br> {0.8 | 4. <br> 8. |
| 6 | 9.6 | 0.8 | 8. |
| $A_2$ | 5.4 | 0.8 | 3.8. |
| V | 9.6 | 4.8 (slot width) | Extending from 3.6 to 8.4. |
| C-2 | 4.2 | None (optional 0.1 for additive). | 3.6. |
| E | 4.8 | None [1] (single screw section (see FIG. 6)). | |

[1] A ⅛-inch diameter port may be placed about 1 inch from upstream end for introduction of a stabilizer, lubricant, colorant, or other additive.

NOTE.—Diameter of barrel opening=0.8 inch.

DESCRIPTION OF WORMS OR SCREWS

All mill worms have a constant pitch of 0.800 inch and screw diameter of 0.804 inch. The values given for each screw are the root diameter and screw length. All mill worms are mirrored pairs (counter rotating). All mill worms have a flight width of 3/32 inch. Extrusion worms are a non-mirror pair used to move the polymer into the single barrel terminal section (FIG. 6) and then out the die. Cylindrical compounders (CY) are cylindrical solid worm sections described by diameter and length. They are mirrored pairs.

The double-flighted reverse compounder (DR) has double-start reverse flights with a pitch of 0.800 inch. Similarly, the double-flighted forward compounder (DF) has double-start forward flights with an 0.8 inch pitch. They have a screw diameter of 0.804 inch and a root diameter of 0.679 inch and a flight width of 3/32 inch. All compounders are 1.2 inches long.

Screws (from section 2 to section E) in FIG. 8:

| Type: | Root diameter, length (inch) |
|---|---|
| Mill | 0.660, 4.2 |
| Mill | 0.710, 3.0 |
| CY | 0.801, 1.2 |
| Mill | 0.460, 4.2 |
| Mill | 0.610, 4.2 |
| Mill | 0.610, 4.2 |
| CY | 0.775, 1.2 |
| Mill | 0.700, 4.2 |
| Mill | 0.700, 4.2 |
| CY | 0.750, 1.2 |
| Mill | 0.610, 4.2 |
| Mill | 0.660, 3.0 |
| DF | 0.679, 1.2 |
| DR | 0.679, 1.2 |
| Mill | 0.565, 4.2 |
| Mill | 0.565, 3.6 |
| CY | 0.731, 1.2 |
| Extrusion | 0.600, 9.0 |

A polymer syrup of composition given above (in general, the syrup can contain solvents as well as monomer(s)) and a latex of composition given above were added at different points of a twin screw extruder set up as shown in FIG. 8. The unreacted monomers and the non-polymer fraction of the latex were removed from the extruder at different points, the monomer as vapor and the aqueous solution as a liquid. The polymer fractions from both feeds were mixed and extruded through a die to give uniform polymer blend with very little residual monomer and water.

The polymer syrup was introduced to the feed section 2 of the extruder at 170° C. [120–240] at 80 p.s.i. [50–1000 p.s.i. or higher]. The polymer was carried by the twin screws from the feed section into a vent section V and A, A being operated at substantially lower pressure (e.g.) atmospheric pressure and V under vacuum. The feed section was separated from the vent section by a 1.2 inch compounder 0.801 inch in diameter. In the vent area 94% [90 to 98%] of the monomer was vaporized and was removed from the polymer syrup. The monomer vapor was condensed after it left the vents and collected as a liquid.

The polymer melt containing 6% [10 to 2%] dissolved monomer passed over an 0.775 inch compounder and was carried into the latex dewatering zone (sections 5 and 6). Into this zone three streams are passed, the polymer syrup carried forward by the screws, also the latex and coagulating liquid 2% aqueous $CaCl_2$ or methanol) brought into the zone by pumps through ports 32 and 33, of a single (or double) screw vent cleaner. The latex was heated to 70° C. [30 to >100° C.] in a heat exchanger and then introduced into the dewatering zone, preferably via port 32 of a down-driving single (double) screw vent cleaner. Once in the extruder the latex was heated by its environment. Thus superheated steam may be introduced into the extruder or into the latex to provide the necessary thermal requirement. A stream of 5 cc./min. of aqueous 2% calcium chloride or aqueous 2% methanol preheated to 100° C. [20°–200° C.] was forced into port 32 and facilitated the smooth operation of the inlet vent cleaner (and coagulated the polymer from the latex). With a twin-screw self-cleaning inlet vent cleaner, a larger degree of precoagulation could be applied.

The dewatering zone barrel temperatures (sections 5 and 6) were maintained at 210° C. [100–300° C.] and a pressure of 370 p.s.i. [25–1000 p.s.i.] was kept within this zone. The pressure was developed by the latex pump and regulated by a suitable pressure relief valve, such as a gas (e.g. nitrogen) loaded Grove pressure relief or let-down valve. Thus the pressure of nitrogen applied on the nitrogen side of the relief valve determined the pressure within the dewatering zone. The pressure used in the dewatering zone was governed by the need to keep the water in a liquid form. The lower limit of the dewatering zone pressure is the pressure needed to keep water as a liquid under the temperature conditions experienced by water in that zone.

Two streams exit from this dewatering zone, (1) a viscous polymer mixture on the screws which is composed of the polymer brought into the zone by the screws plus the polymer from the latex and (2) the aqueous portion of the latex. The water and soluble materials therein leave this section 6, preferably by an exit single (or double) screw, down-driving, vent cleaner. The aqueous solution then passes through at heat exchanger which cooled it from 150° C. [100–300° C.] to 80° C. This cooled aqueous solution then left the system through the pressure let-down valve. The mixture of the two polymers left the dewatering zone by passing over a pair of double reverse compounders which sealed off the downstream end of the dewatering section as the single 0.775 inch compounder sealed the zone from the upstream.

The polymer melt then entered an atmospheric vent section A where residual dissolved water and monomer was vaporized. The vapors were condensed and collected as a liquid. The polymer melt then was carried over a single 0.731 inch compounder into a vacuum vent section where the well-mixed polymer melt was exposed to a vacuum of 29 inches of Hg. In this section more dissolved water and monomers were removed, condensed, and collected as a liquid. The polymer melt moved out of this section over a 0.731 inch compounder into a closed extruder section where a solution of an additive, such as a stabilizer, lubricant, or coloring agent, was added under pressure via constant flow type pump. The additive was well mixed into the polymer melt by the constant kneading action of the twin screws and this mixture then passed out of the extruder through a two-hole strand die. At the die a pressure of 800 p.s.i. [100–5000 p.s.i.] and a temperature of 280° [100–400° C.] was obtained by the use of a variable restriction and electric die heater.

Thus 100 g./min. [40–400 g./min.] of a 50% [25–75%] polymer-in-monomer syrup was fed into section 2 of the extruder and 46 g./min. [90 to 98% min.] of the monomers (and solvents) were removed in the devolatilization sections V and A concurrently 100 g./min. [40–400 g./min.] of a 50% [25–60%] solids latex was added in the dewatering section 5 together with 5 g./min. [1–10 g./min.] of an aqueous 2% $CaCl_2$ solution. A stream of 45 g./min. of water left the system via the water let-down system. A stabilizer solution in a long chain alcohol was added to the closed section of the extruder at 47 g./hr. and 100 [30–300] g./min. of polymer left the extruder in strand form. This polymer was an intimate blend of the polymers from the latex and the syrup and the ingredients of the stabilizer solution. It contained less than 0.10% [0.5–0.005%] residual monomer(s) and solvent(s), less than 0.10% [0.20 to <0.05%] water, and less than 0.008% [0.015–0.005%] potassium from the soap (or emulsifier) used to make the latex.

The example has the inlet and outlet set up so that the addition of latex is concurrent relative to the polymer from the polymer syrup but countercurrent addition is also acceptable.

The vent clear screws were driven at 150 r.p.m. Values in the 100 to 350 r.p.m. are acceptable.

When the polymer-in-monomer syrup going into the syrup devolatilizing sections contains 50% by weight monomer, the melt leaving this section generally contains 2 to 10% monomer. The melt leaving the dewatering zone contains from 4 to 10% dissolved water. More than 95% of the soap (dispersants) is removed from the latex by this system; thus the soap concentration in the final product is quite low. Less than 5% of the latex soap is found in the final product. The final product generally has low residual monomer (0.30 to 0.20%) and a low potassium content (0.005 to 0.015%) from the potassium soap.

While the specific construction described of the embodiments of FIGS. 6 through 8 is of a laboratory size of the equipment, it is to be understood that commercial equipment can be used instead wherein the screw diameter may be up to 8 inches or more in size.

I claim:

1. A process for blending at least two polymers, at least one of which is provided initially in the form of a liquid-containing polymer material or composition comprising continuously feeding one (A) of the polymers to be blended to the main channel of a screw press in which the screw advances it in viscous plastic form along the main channel, continuously feeding a stream of a liquid-containing composition, which contains a second polymer (B) to be blended with the first, through a feed channel to the main channel of the screw press at a point thereof containing the first polymer stream, continuously coagulating the stream containing the second polymer at a point near the entry of the latter stream into the main channel, maintaining the temperature in the channel sufficiently high to render the resulting polymer coagula tacky so that they are cohesive to one another and adhesive to the first-fed polymer whereby the action of the screw simultaneously blends the polymers together, advances them together within the channel toward an end thereof spaced from the points of entry of the two polymers, and expresses liquid liberated from the liquid-containing second polymer composition during coagulation to a liquid-discharge channel communicating with the main channel, and controlling the release of liquid from the discharge channel so that the pressure within the main channel and liquid discharge channel is high enough to maintain the liquid in the liquid state under the condition of temperature prevailing in the system.

2. A process according to claim 1 in which the stream of blended polymer is exposed to atmospheric pressure to vaporize at least part of the residual liquid in the polymer blend.

3. A process according to claim 1 in which the stream of blended polymer is exposed to subatmospheric pressure to vaporize at least part of the residual liquid in the polymer blend.

4. A process in accordance with claim 1 in which the (A) is supplied to the main channel in the form of a solution in a volatile organic liquid, and as the solution advances in the channel to the point therein where the liquid-containing polymer (B) composition is fed in, organic liquid is removed by volatilization.

5. A process in accordance with claim 1 in which the polymer (A) is supplied to the main channel in the form of an aqueous dispersion and is coagulated therein, and the temperature of the resulting coagula is sufficiently high to render the coagula tacky.

6. A process for blending at least two polymers, one of which is in a viscous solution containing the polymer dissolved in a solvent therefor and another is in an aqueous dispersion thereof, which comprises continuously feeding a stream of the viscous polymer solution to the main channel of a screw press in which it advances along the channel, subjecting this polymer stream as it moves along a portion of the channel to a subatmospheric pressure to cause volatilization of the solvent therefrom, continuously feeding a stream of the polymer dispersion through a feed channel to the main channel of the screw press at a point thereof containing the first polymer stream after it has passed through the subatmospheric section, continuously coagulating the stream containing the second polymer at a point near the entry of the latter stream into the main channel, maintaining the temperature in the channel sufficiently high to render the polymer coagula tacky so that they are cohesive to one another and adhesive to the first-fed polymer whereby the action of the screw blends the polymers together, advances them together within the channel toward an end thereof spaced from the points of entry of the two polymers, and expresses liquid liberated from the liquid-containing second polymer composition by the coagulating process to a liquid-discharge channel communicating with the main channel, and controlling the release of liquid from the discharge channel so that the pressure within the main channel and the liquid discharge channel is high enough to maintain the liquid in the liquid state under the condition of temperature prevailing in the system.

7. A process according to claim 6 wherein the stream of blended polymer is exposed to atmospheric pressure to vaporize at least part of the residual liquid in the polymer blend.

8. A process according to claim 6 wherein the stream of blended polymer is exposed to subatmospheric pressure to vaporize at least part of the residual liquid in the polymer blend.

9. A process for blending at least two polymers, at least one of which is provided initially in the form of a liquid-containing polymer material or composition, comprising continuously feeding of stream of one (A) of the polymers to be blended to the main channel of a screw press in which the screw advances the stream in viscous plastic form along the main channel, continuously feeding a stream of a liquid-containing composition, which contains a second polymer to be blended with the first, through a feed channel to the main channel of the screw press at a point thereof containing the first polymer stream, feeding a liquid coagulating agent continuously to the stream containing the second polymer at a point near the entry of the latter stream into the main channel, maintaining the temperature in the channel sufficiently high to render the resulting polymer coagula tacky so that they are cohesive to one another and adhesive to the first-fed polymer whereby the action of the screw blends the polymers together, advances them together within the channel toward an end thereof spaced from points of entry of the two polymers, and expressses liquid liberated from the liquid-containing second polymer composition by the coagulating process to a liquid-discharge channel communicating with the main channel, and controlling the release of liquid from the discharge channel so that the pressure within the main channel and the liquid discharge channel is high enough to maintain the liquid in the liquid state under the condition of temperature prevailing in the system.

10. A process according to claim 9 in which the stream of blended polymer is exposed to atmospheric pressure to vaporize at least part of the residual liquid in the polymer blend.

11. A process according to claim 9 in which the stream of blended polymer is exposed to subatmospheric pressure to vaporize at least part of the residual liquid in the polymer blend.

12. A process according to claim 9 wherein the coagulating agent is a salt or a water-miscible liquid in which the polymers are insoluble.

13. A process for blending at least two polymers, one of which is in a viscous solution containing the polymer dissolved in a solvent therefor and another is in an aqueous dispersion thereof, which comprises continuously feeding a stream of the viscous polymer solution to the main channel of a screw press in which it advances along the channel, subjecting this polymer stream as it moves along a portion of the channel to a subatmospheric pressure to cause volatilization of the solvent therefrom, continuously feeding a stream of the polymer dispersion through a feed channel to the main channel of the screw press at a point thereof containing the first polymer stream after it has passed through the subatmospheric section, feeding a liquid coagulating agent continuously to the stream containing the second polymer at a point near the entry of the latter stream into the main channel, maintaining the temperature in the channel sufficiently high to render the polymer coagula tacky so that they are cohesive to one another and adhesive to the first-fed polymer whereby the action of the screw blends the polymers together, advances them together within the channel toward an end thereof spaced from the points of entry of the two polymers, and expresses liquid liberated from the liquid-containing second polymer composition by the coagulating process to a liquid-discharge channel communicating with the main channel, and controlling the release of liquid from the discharge channel so that the pressure within the main channel and liquid discharge channel is high enough to maintain the liquid in the liquid state under the condition of temperature prevailing in the system.

14. A process according to claim 13 wherein the stream of blended polymer is exposed to atmospheric pressure to vaporize at least part of the residual liquid in the polymer blend.

15. A process according to claim 13 wherein the stream of blended polymer is exposed to subatmospheric pressure to vaporize at least part of the residual liquid in the polymer blend.

16. A process according to claim 13 wherein the coagulating agent is a salt or a water-miscible liquid in which the polymers are insoluble.

References Cited

UNITED STATES PATENTS

| | | | |
|---|---|---|---|
| 3,218,039 | 11/1965 | Baer | 259—6 |
| 3,215,275 | 11/1965 | Bastecky et al. | 210—179 |
| 2,408,128 | 9/1946 | Squires et al. | 260—96 |
| 3,451,462 | 6/1969 | Szabo et al. | 159—2 |
| 3,323,222 | 6/1967 | Skidmore et al. | 34—17 |

JOHN C. BLEUTGE, Primary Examiner

C. J. SECCURO, Assistant Examiner

U.S. Cl. X.R.

210—71, 179; 259—6, 97; 260—DIG 22, 29.6 RB, 29.7 PT, 901